(12) United States Patent  
Hirschenberger

(10) Patent No.: US 7,386,272 B2  
(45) Date of Patent: Jun. 10, 2008

(54) SYSTEM AND METHOD FOR TRANSMITTING SIGNALS HAVING AUDIO DATA IN A VEHICLE

(75) Inventor: Frank M. Hirschenberger, Oxford, MI (US)

(73) Assignee: Delphi Technologies, Inc., Troy, MI (US)

( * ) Notice: Subject to any disclaimer, the term of this patent is extended or adjusted under 35 U.S.C. 154(b) by 513 days.

(21) Appl. No.: 11/057,915

(22) Filed: Feb. 15, 2005

(65) Prior Publication Data

US 2006/0183448 A1 Aug. 17, 2006

(51) Int. Cl.
*H04H 1/00* (2006.01)
*H04B 7/00* (2006.01)
*H04B 1/18* (2006.01)

(52) U.S. Cl. .................. 455/3.02; 455/41.2; 455/161.1

(58) Field of Classification Search ............... 455/3.02, 455/422.1, 41.2, 7, 12.1, 11.1, 73, 42, 161.1, 455/277.1, 3.01

See application file for complete search history.

(56) References Cited

U.S. PATENT DOCUMENTS

| 5,970,390 | A  | * | 10/1999 | Koga et al. ................... 455/42 |
| 6,493,546 | B2 | * | 12/2002 | Patsiokas ................. 455/277.1 |
| 7,062,238 | B2 | * | 6/2006  | Glaza ....................... 455/161.1 |
| 2003/0236075 | A1 | * | 12/2003 | Johnson et al. ............... 455/99 |
| 2004/0077309 | A1 | * | 4/2004  | Brass et al. ..................... 455/7 |
| 2007/0139878 | A1 | * | 6/2007  | Giffin et al. ................. 361/684 |

* cited by examiner

*Primary Examiner*—Sonny Trinh
(74) *Attorney, Agent, or Firm*—Scott A. McBain

(57) ABSTRACT

A system and a method for transmitting signals having audio data in a vehicle are provided. The system includes a first transceiver configured to receive an analog communication signal having the audio data and to transmit a first FM signal having the audio data in an ISM frequency band in response to the analog communication signal. The first FM signal is transmitted at a first predetermined power level. The system further includes a second transceiver configured to receive the first FM signal and to transmit a second FM signal having the audio data in an FM frequency band in response to the first FM signal. The second FM signal is transmitted at a second predetermined power level less than the first predetermined power level.

20 Claims, 3 Drawing Sheets

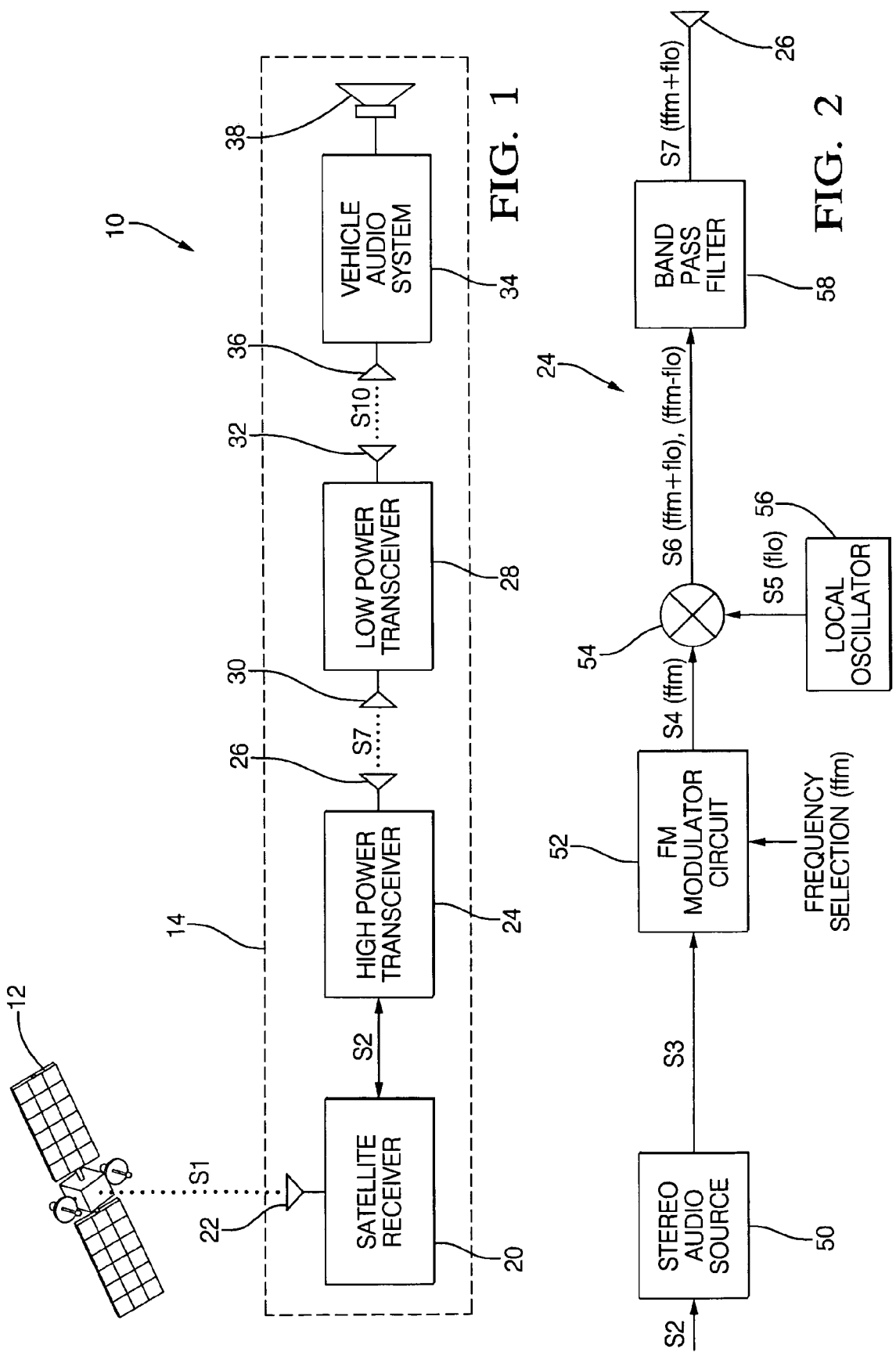

SYSTEM AND METHOD FOR TRANSMITTING SIGNALS HAVING AUDIO DATA IN A VEHICLE

TECHNICAL FIELD

This application relates to a system and a method for transmitting signals having audio data in a vehicle.

BACKGROUND

Satellite radio receivers have been developed for use in vehicles. Generally, a satellite transmits a signal having audio data that is received by the satellite radio receiver. Thereafter, a modulator circuit coupled to the satellite radio receiver transmits an FM signal having the audio data in a FM frequency band to an antenna of a vehicle audio system in response to the received signal. The vehicle audio system then emits audio sounds in response to the received FM signal.

A problem associated with the foregoing system configuration, is that the FM signal transmitted from the modulator circuit has a relatively low power level, due to regulated power levels set forth by the Federal Communications Commission for signals in the FM frequency band. Thus, the FM signal received at the antenna of the vehicle audio system has a relatively low signal-to-noise ratio that undesirably results in distorted audio sounds being emitted from the vehicle audio system.

Thus, there is a need for a system and a method for transmitting signals having audio data in a vehicle that eliminates and/or reduces the foregoing problem.

SUMMARY

A system for transmitting signals having audio data in a vehicle in accordance with an exemplary embodiment is provided. The system includes a first transceiver configured to receive an analog communication signal having the audio data and to transmit a first FM signal having the audio data in an ISM frequency band in response to the analog communication signal. The first FM signal is transmitted at a first predetermined power level. The system further includes a second transceiver configured to receive the first FM signal and to transmit a second FM signal having the audio data in an FM frequency band in response to the first FM signal. The second FM signal is transmitted at a second predetermined power level less than the first predetermined power level.

A method for transmitting signals having audio data in a vehicle in accordance with another exemplary embodiment is provided. The method includes receiving a digital communication signal having audio data from a source external from the vehicle. The method further includes transmitting a first FM signal having the audio data in an ISM frequency band from a first transceiver in response to the digital communication signal. The first FM signal is transmitted at a first predetermined power level. The method further includes receiving the first FM signal at a second transceiver and transmitting a second FM signal having the audio data in an FM frequency band in response to the first FM signal. The second FM signal is transmitted at a second predetermined power level less than the first predetermined power level.

BRIEF DESCRIPTION OF THE DRAWINGS

FIG. 1 is a block diagram of a communication system having a system for transmitting signals with audio data in a vehicle in accordance with an exemplary embodiment;

FIG. 2 is a block diagram of a high power transceiver utilized in the system of FIG. 1;

DESCRIPTION OF EXEMPLARY EMBODIMENTS

Figure 3:
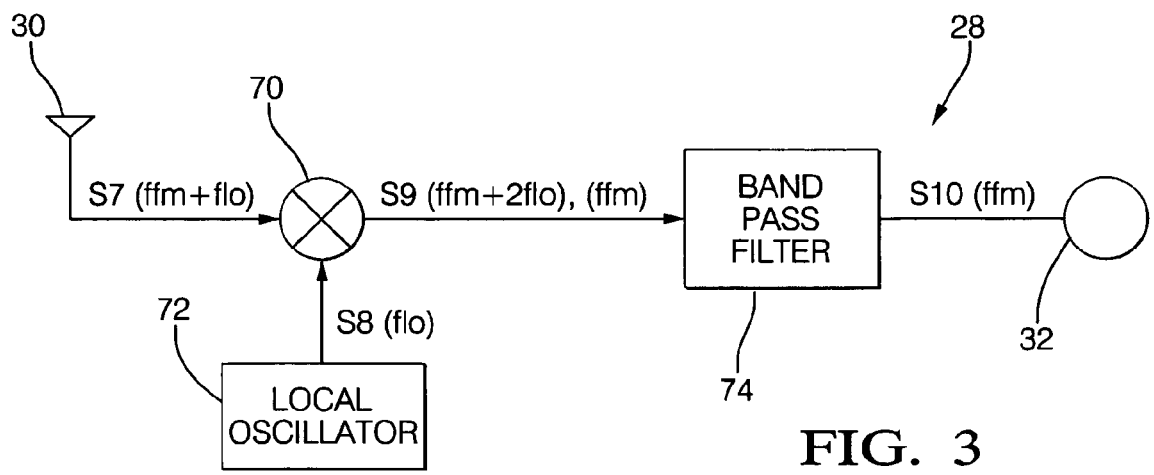
FIG. 3 is a block diagram of a low power transceiver utilized in the system of FIG. 1.

Referring to FIGS. 1 and 2, a communication system 10 including a satellite 12 and a vehicle 14 is illustrated. The satellite 12 generates digital communication signals having audio data that are transmitted to the vehicle 14. The vehicle 14 includes a high power transceiver 24 that transmits a first FM signal having audio data in an ISM frequency band at a relatively high power level to a low power transceiver 28. In response, the low power transceiver 28 transmits a second FM signal at an FM frequency and a relatively low power level to the vehicle audio system 34, wherein the transceiver 28 is in close proximity to the vehicle audio system 34. The second FM signal received by the vehicle audio system 34 has a relatively high signal-to-noise ratio resulting in improved sound quality from the system 34, as compared to other systems.

The vehicle 14 is provided to hold therein the remaining vehicle-based components of the system 10. The vehicle 14 includes a satellite receiver 20, the high power transceiver 24, the low power transceiver 28, the vehicle audio system 34, and a speaker 38.

The satellite receiver 20 is provided to receive the digital communication signals having audio data from the satellite 12. In particular, the satellite receiver 20 is configured to receive the digital communication signal (S1) from the satellite 12 via the antenna 22. Further, the satellite receiver 20 is configured to generate an analog communication signal (S2) having the audio data based on the signal (S1) and to transmit the signal (S2) to the high power transceiver 24.

The high power transceiver 24 is provided to transmit wireless signals at a first predetermined power level to the low power transceiver 28. In particular, the high power transceiver 24 is configured to receive the analog communication signal (S2) having the audio data and to generate the FM signal (S7) having the audio data in an ISM frequency band at a first predetermined power level, in response to the signal (S2). The ISM frequency band comprises at least one of the following frequency bands: (i) a 902-928 megahertz frequency band, (ii) a 2.4-2.483 gigahertz frequency band, and (iii) a 5.725-5.85 gigahertz frequency band. The first predetermined power level is less than or equal to 50 millivolts per meter at three meters from the transceiver 24 per 120 kilohertz of bandwidth of the FM signal (S7). The high power transceiver 24 includes a stereo audio source 50, an FM modulator circuit 52, a mixer circuit 54, a local oscillator 56, a band pass filter 58, and an antenna 26.

The stereo audio source 50 is configured to receive the analog signal (S2) from the satellite receiver 20 and to output a signal (S3) having the audio data, based on the signal (S2). The stereo audio source 50 is operably coupled between the satellite receiver 20 and the FM modulator circuit 52.

The FM modulator circuit 52 is configured to receive the signal (S3) from the stereo audio source 50 and to generate an FM signal (S4) having a frequency component (ffm), based on the signal (S3). The frequency (ffm) comprises a frequency within a 87-108 megahertz frequency band. The FM modulator circuit 52 transmits the FM signal (S4) to the mixer circuit 54.

The mixer circuit 54 is configured to receive the FM signal (S4) having the frequency component (ffm), and a local oscillator signal (S5) having a frequency component (flo) from the local oscillator 56. The frequency component (flo) is less than the frequency component (ffm). The mixer circuit 54 is further configured to generate the signal (S6) having a first frequency component (ffm+flo) and a second frequency component (ffm−flo). Further, the mixer circuit 54 transmits the signal (S6) to the band pass filter 58.

The band pass filter 58 is configured to receive the signal (S6) having the first frequency component (ffm+flo) and the second frequency component (ffm−flo). Further, the band pass filter 58 is configured to remove the second frequency component (ffm−flo) that is outside of the ISM frequency band from the signal (S6,) to obtain the FM signal (S7). The band pass filter 58 transmits the FM signal (S7) having the frequency component (ffm+flo) within the ISM frequency band from the antenna 26.

Referring to FIGS. 1 and 3, the low power transceiver 28 is provided to receive FM signals having audio data at a first predetermined power level from the high power transceiver 24 and to retransmit FM signals at a second predetermined power level that is less than the first predetermined power level. In particular, the low power transceiver 28 is provided to receive the FM signal (S7) utilizing the antenna 30 and to transmit an FM signal (S10) having the audio data in an FM frequency band at a second predetermined power level in response to the signal (S7) received by the antenna 32. The second predetermined power level is less than or equal to 150 microvolts per meter at three meters from the transceiver 28 per 120 kilohertz of bandwidth of the FM signal (S10). The low power transceiver 28 includes a mixer circuit 70, a local oscillator 72, a band pass filter 74, and an antenna 32.

The mixer circuit 70 is configured to receive the FM signal (S7) having the frequency component (ffm+flo) from the high power transceiver 28 via the antenna 30. The mixer circuit 70 is further configured to receive the local oscillator signal (S8) having the frequency component (flo) from the local oscillator 72. The mixer circuit 70 is further configured to generate the signal (S9) having a first frequency components (ffm+2flo) and a second frequency component (ffm), utilizing the signals (S7) and (S8). The mixer circuit 70 is further configured to transmit the signal (S9) to the band pass filter 74.

The band pass filter 74 is configured to receive the signal (S9) having the first frequency component (ffm+2flo) and the second frequency component (ffm). Further, the band pass filter 74 is configured to remove the first frequency component (ffm+2flo) that is outside of the FM frequency band from the signal (S9), to obtain the FM signal (S10). The band pass filter 74 transmits the FM signal (S10) having the frequency component (ffm) from the FM antenna 32.

Referring to FIG. 1, the vehicle audio system 34 is configured to receive the FM signals from the low power transceiver 28 and to induce the speaker 38 to emit sound based upon the FM signals. In particular, the vehicle audio system 34 is configured to receive the FM signal (S10) having a frequency component (ffm) from the antenna 32. In response, the vehicle audio system 34 induces the speaker 38 to emit sound based on the audio data contained within the FM signal (S10).

Figure 4:
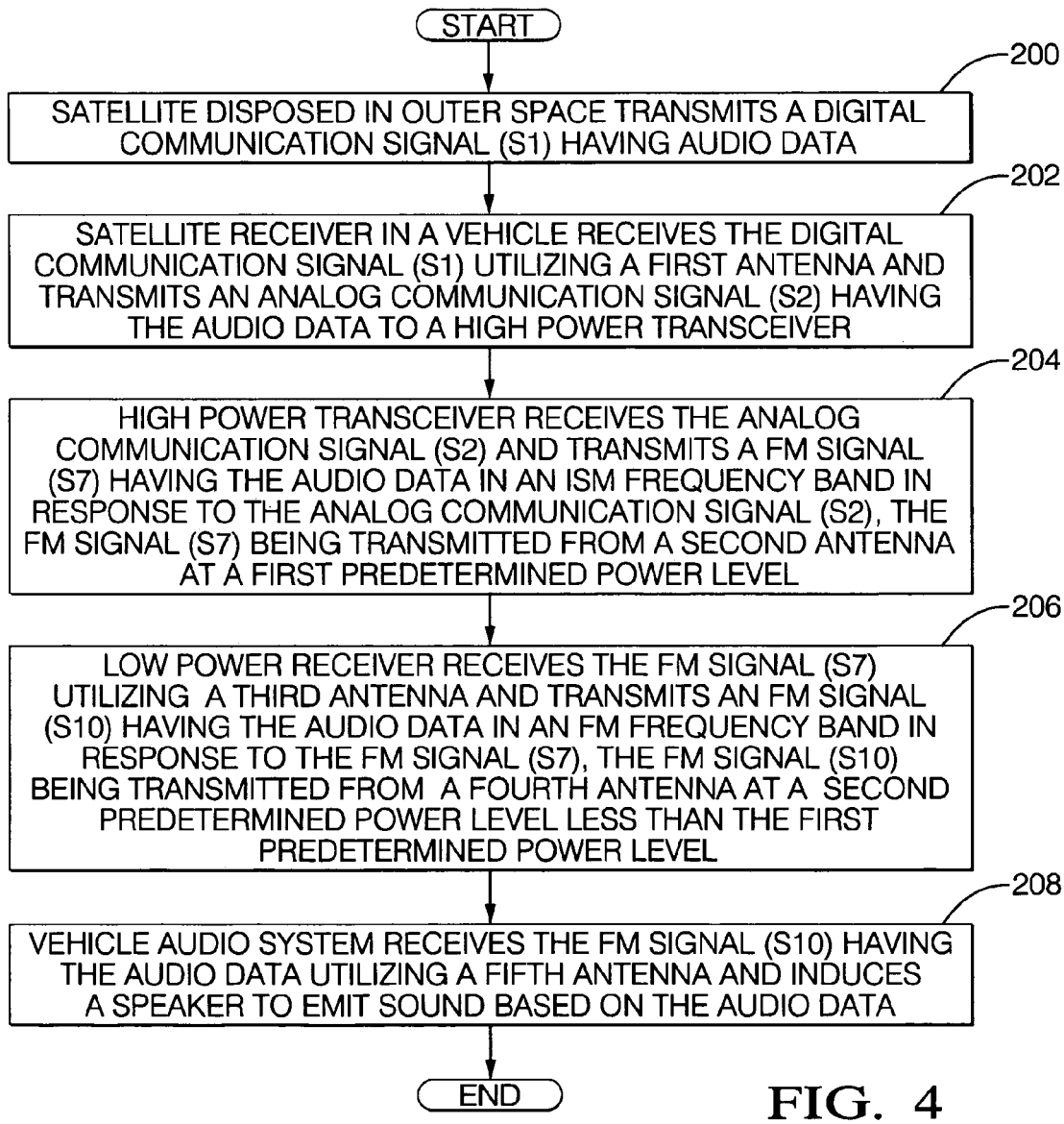
FIGS. 4-6 are flowcharts of a method for transmitting signals having audio data in a vehicle.
Figure 5:
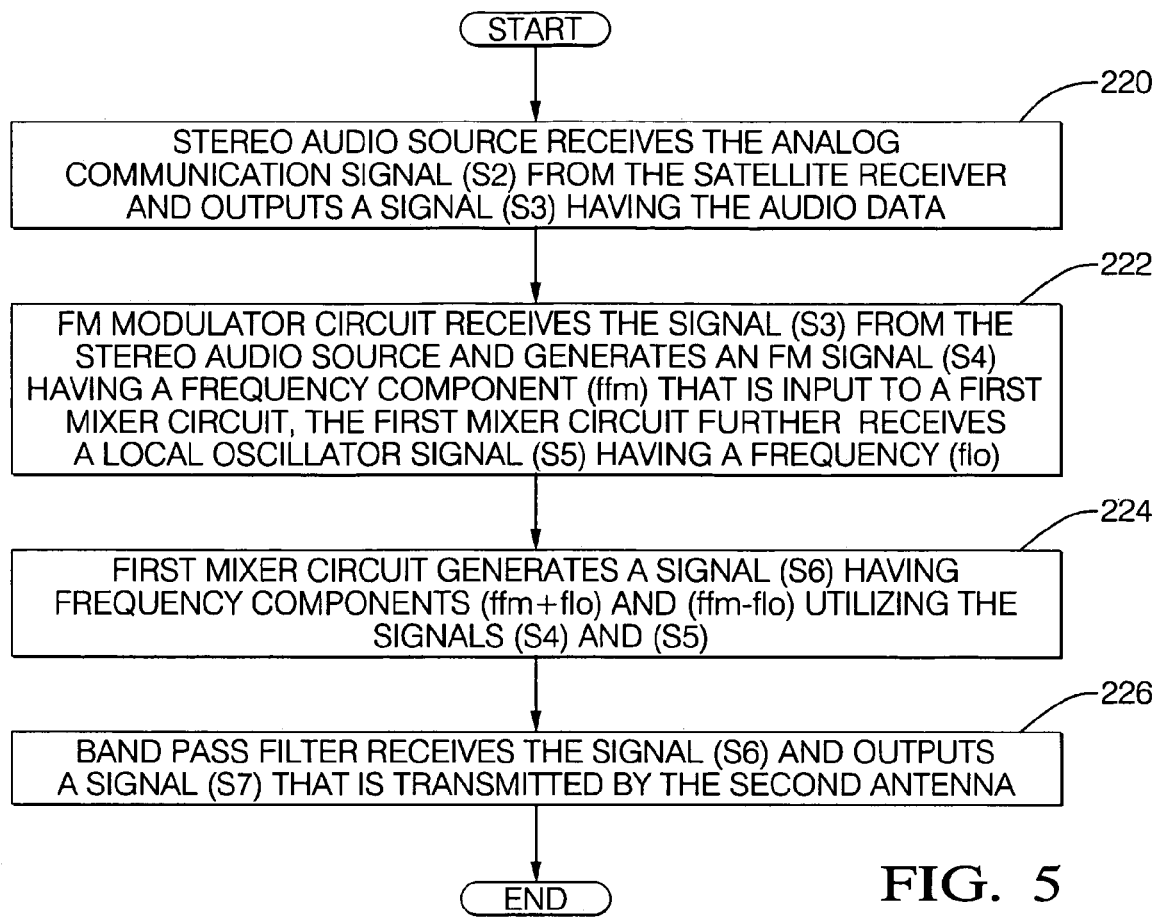
Figure 6:
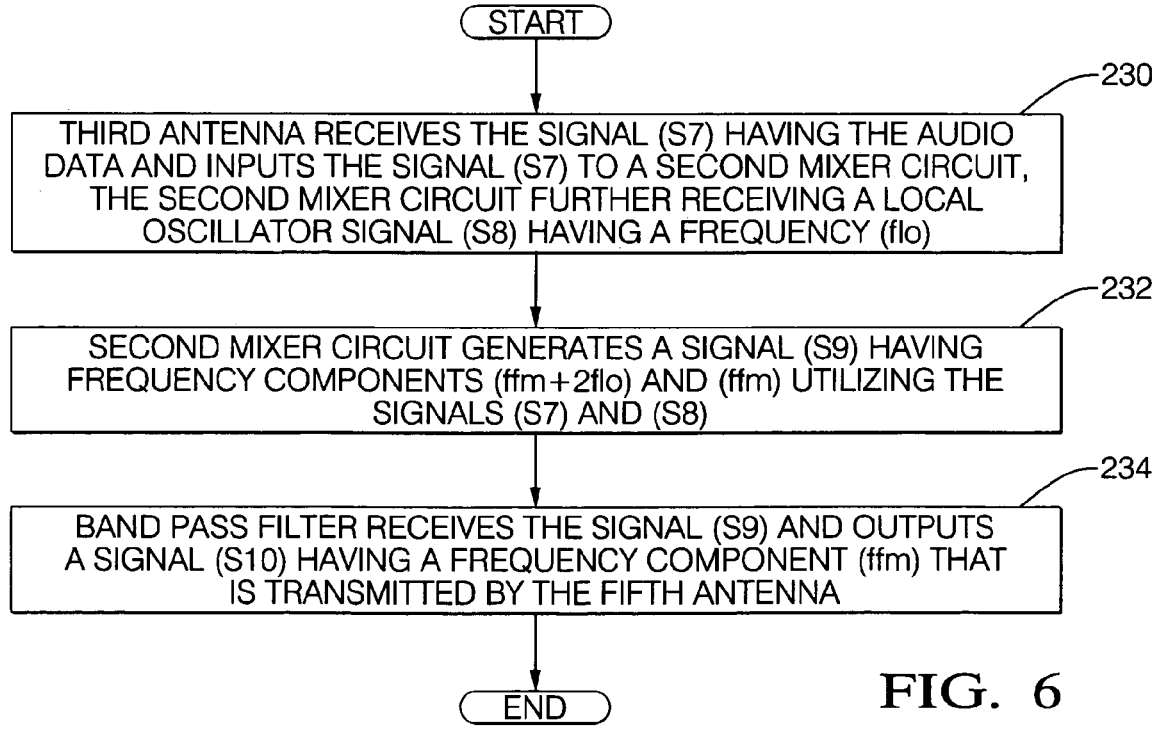

Referring to FIGS. 4-6, a method for transmitting signals having audio data in a vehicle 14 will now be explained. The method is implemented utilizing the system 10 described above.

At step 200, the satellite 12 disposed in outer space transmits the digital communication signal (S1) having audio data.

At step 202, the satellite receiver 20 in the vehicle 14 receives the digital communication signal (S1) utilizing the antenna 22 and transmits the analog communication signal (S2) having the audio data to the high power transceiver 24.

At step 204, the high power transceiver 24 receives the analog communication signal (S2) and transmits a FM signal (S7) having the audio data in an ISM frequency band in response to the analog communication signal (S2). The FM signal (S7) is transmitted from the antenna 26 at a first predetermined power level. Referring to FIG. 5, the step 204 is implemented utilizing the steps 220-226.

At step 220, the stereo audio source 50 receives the analog communication signal (S2) from the satellite receiver 20 and outputs a signal (S3) having the audio data.

At step 222, the FM modulator circuit 52 receives the signal (S3) from the stereo audio source 50 and generates a FM signal (S4) having a frequency component (ffm) that is input to the mixer circuit 54. The mixer circuit 54 further receives a local oscillator signal (S5) having a frequency component (flo).

At step 224, the mixer circuit 54 generates a signal (S6) having frequency components (ffm+flo) and (ffm−flo) utilizing the signals (S4) and (S5).

At step 226, the band pass filter 58 receives the signal (S6) and outputs a signal (S7) that is transmitted by the antenna 26. After step 226, the method advances to step 206.

Referring to FIG. 4, at step 206, the low power receiver 28 receives the FM signal (S7) utilizing the antenna 30 and transmits an FM signal (S10) having the audio data in an FM frequency band in response to the FM signal (S7). The FM signal (S10) is transmitted from an antenna 32 at a second predetermined power level less than the first predetermined power level. The step 206 is implemented utilizing the steps 230-234.

At step 230, the antenna 30 receives the signal (S7) having the audio data and inputs the signal (S7) to the mixer circuit 70. The mixer circuit 70 further receives a local oscillator signal (S8) having a frequency (flo).

At step 232, the mixer circuit 70 generates a signal (S9) having frequency components (ffm+2flo) and (ffm), utilizing the signals (S7) and (S8).

At step 234, the band pass filter 74 receives the signal (S9) and outputs a signal (S10) having a frequency component (ffm) that is transmitted by the antenna 32. After step 234, method advances to step 208.

At step 208, the vehicle audio system 34 receives the FM signal (S10) have the audio data utilizing an antenna 36 and induces the speaker 38 to emit sound based on the audio data.

The system and the method for transmitting signals having audio data in a vehicle provide a substantial advantage over other systems and methods. In particular, the system utilizes a first transceiver to transmit a first FM signal having audio data in an ISM frequency band having a relatively high power level that is received by a second transceiver that transmits a second FM signal in a FM frequency band having a relatively low power level that is received by a vehicle audio system. As a result, the signal-to-noise ratio of the second FM signal is relatively high, as compared to other systems, resulting in improved sound quality from the vehicle audio system 34.

What is claimed is:

1. A system for transmitting signals having audio data in a vehicle, comprising:
   a first transceiver configured to receive an analog communication signal having the audio data and to transmit a first FM signal having the audio data in an ISM frequency band in response to the analog communication signal, the first FM signal being transmitted at a first predetermined power level; and
   a second transceiver configured to receive the first FM signal and to transmit a second FM signal having the audio data in an FM frequency band in response to the first FM signal, the second FM signal being transmitted at a second predetermined power level less than the first predetermined power level.

2. The system of claim 1, further comprising an antenna operably coupled to a vehicle audio system, the antenna receiving the second FM signal and inducing the vehicle audio system to emit sound based on the second FM signal.

3. The system of claim 1, wherein the first transceiver comprises:
   a stereo audio device configured to receive the analog communication signal and to generate a third signal in response to the analog communication signal;
   an FM modulator circuit operably coupled to the stereo audio device, the FM modulator circuit configured to receive the third signal and to generate a fourth FM signal in response to the third signal;
   a mixer circuit operably coupled to the FM modulator circuit, the mixer circuit configured to receive the fourth FM signal and to modulate the fourth FM signal utilizing a modulating signal to obtain a fifth modulated FM signal;
   a filter operably coupled to the mixer circuit, the filter configured to receive the fifth modulated FM signal and to output the first FM signal in the ISM frequency band in response to the fifth modulated FM signal; and
   a first antenna operably coupled to the filter configured to transmit the first FM signal.

4. The system of claim 3, wherein the filter comprises a band-pass filter configured to remove signal components of the fifth modulated FM signal having a frequency outside of the ISM frequency band.

5. The system of claim 3, wherein the antenna comprises an ISM frequency band antenna.

6. The system of claim 1, wherein the second transceiver further comprises:
   a first antenna configured to receive the first FM signal in the ISM frequency band;
   a mixer circuit operably coupled to the first antenna, the mixer circuit configured to receive the first FM signal and to modulate the first FM signal utilizing a modulating signal to obtain a third modulated FM signal;
   a filter operably coupled to the mixer circuit, the filter configured to receive the third modulated FM signal and to output the second FM signal in the FM frequency band in response to the third modulated FM signal; and
   a second antenna operably coupled to the filter, the second antenna configured to transmit the second FM signal.

7. The system of claim 6, wherein the modulating signal has a frequency less than a frequency of the first FM signal.

8. The system of claim 6, wherein the filter comprises a band-pass filter configured to remove signal components of the third modulated FM signal having a frequency outside of the FM frequency band.

9. The system of claim 6, wherein the second antenna comprises an FM frequency band antenna.

10. The system of claim 1, wherein the ISM frequency band comprises at least one of a 902-928 megahertz frequency band, a 2.4-2.483 gigahertz frequency band, and a 5.725-5.85 gigahertz frequency band.

11. The system of claim 1, wherein the first predetermined power level of the first FM signal is less than or equal to 50 millivolts per meter at three meters from the first transceiver per 120 kilohertz of bandwidth of the first FM signal.

12. The system of claim 1, wherein the FM frequency band comprises a 87-108 megahertz frequency band.

13. The system of claim 1, wherein the second predetermined power level of the second FM signal is less than or equal to 150 microvolts per meter at three meters from the second transceiver per 120 kilohertz of bandwidth of the second FM signal.

14. A method for transmitting signals having audio data in a vehicle, comprising:
   receiving a digital communication signal having audio data from a source external from the vehicle;
   transmitting a first FM signal having the audio data in an ISM frequency band from a first transceiver in response to the digital communication signal, the first FM signal being transmitted at a first predetermined power level; and
   receiving the first FM signal at a second transceiver and transmitting a second FM signal having the audio data in an FM frequency band in response to the first FM signal, the second FM signal being transmitted at a second predetermined power level less than the first predetermined power level.

15. The method of claim 14, further comprising:
   receiving the second FM signal at an antenna operably coupled to a vehicle audio system; and
   emitting sound from the vehicle audio system utilizing the audio data in the second FM signal.

16. The method of claim 14, wherein the ISM frequency band comprises at least one of a 902-928 megahertz frequency band, a 2.4-2.483 gigahertz frequency band, and a 5.725-5.85 gigahertz frequency band.

17. The method of claim 14, wherein the first predetermined power level of the first FM signal is less than or equal to 50 millivolts per meter at three meters from the first transceiver per 120 kilohertz of bandwidth of the first FM signal.

18. The method of claim 14, wherein the FM frequency band comprises a 87-108 megahertz frequency band.

19. The method of claim 14, wherein the second predetermined power level of the second FM signal is less than or equal to 150 microvolts per meter at three meters from the second transceiver per 120 kilohertz of bandwidth of the second FM signal.

20. A system for transmitting signals having audio data in a vehicle, comprising:
   a first transceiver configured to receive an analog communication signal having the audio data and to transmit a first FM signal having the audio data in an ISM frequency band in response to the analog communication signal, the first FM signal being transmitted at a first predetermined power level; and
   a second transceiver configured to receive the first FM signal and to transmit a second FM signal having the audio data in an FM frequency band in response to the first FM signal, the second FM signal being transmitted at a second predetermined power level less than the first predetermined power level;

wherein the first transceiver has:

a stereo audio device configured to receive the analog communication signal and to generate a third signal in response to the analog communication signal;

an FM modulator circuit operably coupled to the stereo audio device, the FM modulator circuit configured to receive the third signal and to generate a fourth FM signal in response to the third signal;

a mixer circuit operably coupled to the FM modulator circuit, the mixer circuit configured to receive the fourth FM signal and to modulate the fourth FM signal utilizing a modulating signal to obtain a fifth modulated FM signal, the modulating signal having a frequency greater than a frequency of the fourth FM signal;

a filter operably coupled to the mixer circuit, the filter configured to receive the fifth modulated FM signal and to output the first FM signal in the ISM frequency band in response to the fifth modulated FM signal; and a first antenna operably coupled to the filter configured to transmit the first FM signal.

* * * * *